Feb. 17, 1942.  A. BAERENKLAU ET AL  2,273,169
REPAIR PLUG DRIVING TOOL
Filed Aug. 26, 1940  2 Sheets-Sheet 1
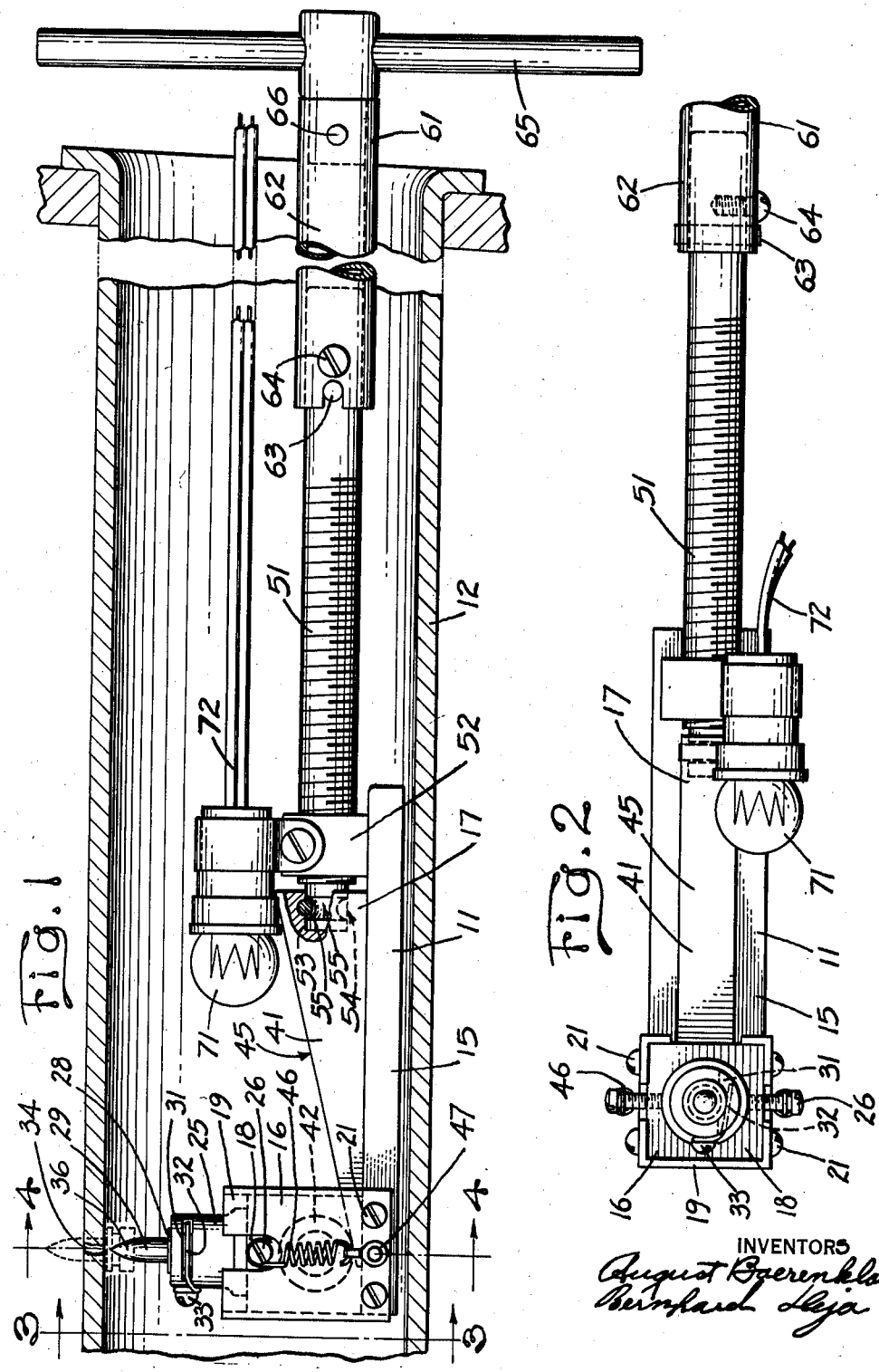
INVENTORS
August Baerenklau
Bernhard Leja Feb. 17, 1942.   A. BAERENKLAU ET AL   2,273,169
REPAIR PLUG DRIVING TOOL
Filed Aug. 26, 1940   2 Sheets-Sheet 2

INVENTORS
August Baerenklau
Bernhard Leja

Patented Feb. 17, 1942

2,273,169

UNITED STATES PATENT OFFICE 2,273,169

REPAIR PLUG DRIVING TOOL

August Baerenklau, Queens Village, and Bernhard Deja, Brooklyn, N. Y.

Application August 26, 1940, Serial No. 354,332

6 Claims. (Cl. 138—97)

Our invention relates, generally, to plug driving tools, and more specifically to the improvement in such tools adapted for use in limited spaces such as the interiors of boiler tubes.

Heretofore, the repair of leaking tubes, in situ, such as those in fire-tube boilers, afforded a serious problem to the owners as well as the repairers of the boilers. When a leak occurred while a boiler was in operation, the usual repair was temporary in nature and resulted in decreased efficiency of the boiler. One manner of effecting the temporary repair was to shut down the boiler long enough to plug both ends of the leaking tube. The boiler would then be used again until it could be shut down long enough to permit removal of the defective tube from the boiler for a more permanent repair or for replacement.

This procedure led to reduced efficiency in boilers when they were in most urgent demand, because plugging of the ends of a boiler tube reduces the effective heat-transferring area of the boiler. Consequently, the second or more permanent repair was made as soon as possible and was usually costly because of the need to hasten the work to place the boiler back into service.

These difficulties, and others, are either avoided entirely or greatly minimized by the use of our repair tool which positions and drives a plug into a leak hole in a boiler tube from within the tube and thereby seals the leak without removing the tube from the boiler. The plug used may be of any suitable shape or size, preferably the one shown in the drawings. The plug shown forms the subject matter of another application (Serial No. 354,331) by August Baerenklau, a joint inventor in the instant application.

Use of this tool and plug makes possible the repair of a fire tube in substantially the same time that it would take to plug the tube ends in the old procedure, abovementioned. This will be made more obvious after a reading in full of the following description.

An object of the present invention is to provide a tool for operation within long but narrow confines, such as that within tubular bodies, to releasably hold a repair plug and drive it with great force, laterally, into a leak hole.

Another object of the invention is the provision of means on such a tool whereby it may be caused to function at distances remote from the operator.

Still another object of the invention is the provision of illuminating means attached to the tool whereby the operator is assisted in locating and sealing the leak hole when it is at a remote position within the passage or tube.

Many other objects and advantages of the invention will be apparent as it is better understood from the following description, which, taken together with the accompanying drawings, discloses a preferred embodiment thereof.

Referring to the drawings:

Fig. 1 shows a longitudinal section of a leaking tube, and a tool, embodying a preferred form of our invention, in position within the tube to insert a plug into a leak hole;

Fig. 2 is a plan view of the tool;

Throughout the following detailed description of our invention, the same numerals or letters will be used to designate like figures or parts.

Figure 3:
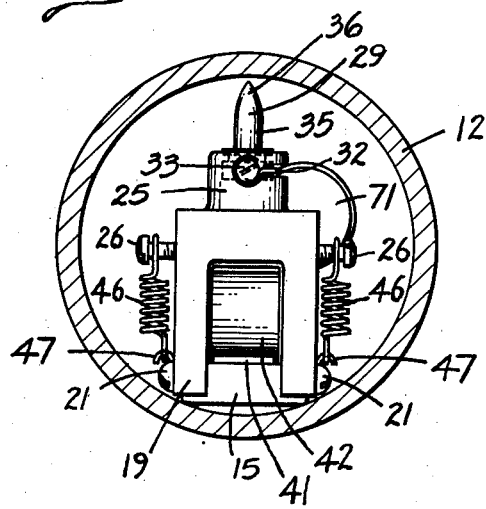
Fig. 3 is a transverse section through the tube, taken on the line 3—3 in Fig. 1, showing a full end view of the tool.

Referring to the drawings, the reference numeral 11 designates the repair plug driving tool generally, and the tube, within which it is shown as operating, is indicated by the numeral 12.

The tool 11 comprises a base 15 on which is mounted a head or elevator 16 and a head drive 17. All parts associated with the tool are compactly assembled so that the tool may be inserted, and moved about, within the tube or other narrow confines in which the repair is to be made.

The head or elevator 16 comprises a cube-shaped slide 18 mounted, for transverse reciprocation with respect to the longitudinal axis of the tool, in a guide frame 19, fixed by screws 21, to the left end of the base 15, as viewed in Figs. 1 and 2. The upper portion of the slide 18 is provided with a bore 23 (see Fig. 4) which accommodates a stem 24 of a plug holder 25. A pair of screws 26, diametrically opposed and threaded in the slide 18, grip the stem 24 to retain the plug holder 25 in place on the slide.

In the top of the holder 25 is formed a recess 27 adapted to receive a head 28 of a repair plug 29. Various means may be resorted to to releasably grip the head of the plug in the recess 27, such as magnetizing the holder 25, or making the fit between the plug head and recess walls a snug one. However, the preferred plug gripper, shown in the drawings, acts through a slot 31 cut through the lateral wall of the plug holder 25 into the recess 27. The gripper comprises a spring 32, held at one end by a screw 33 to the outer wall of the plug holder, and projecting freely along the slot 31 to engage, with some tension, the lateral wall of the plug head 28.

The body of the plug extends upwardly of its head, as viewed in Figs. 1 and 3, and is directed toward a leak hole 34 in the tube 12. The body of plug 29 comprises a cylindrical or slightly tapered shank 35 surmounted by a pointed, paraboloidal nose 36.

To raise the plug and force it home in the leak hole, the elevator 16 is raised by the drive 17. This drive comprises a wedge 41 which rests on the upper surface of the base 15 and is horizontally reciprocable under a roller 42 rotatably mounted upon a pin 44 and within a slot 43 in the lower end of the slide 18. The roller 42 normally rests on an inclined surface 45 of the wedge 41 and is urged thereagainst under yielding tension of a pair of springs 46 which tend to retract the slide 18 against the action of the wedge. Each of these springs is hooked, at one end, over the body of one of the screws 26 which extends outwardly and laterally of the slide 18 and overhangs the frame 19 for this purpose. The other end of each spring 46 is engaged over a hook 47 riveted to the frame 19.

Reciprocation of the wedge 41 to the left, as viewed in Fig. 1, advances the slide upwardly against the tension of springs 46, and reverse movement of the wedge permits those springs to retract the slide in its frame 19. This reciprocation of wedge 41 is effected by rotation of a screw 51 threadedly engaged in a block 52 formed integrally with the base 15 adjacent its right end. The left end of screw 51 is turned down at 53 and projects into a bore 54 in the right end of the wedge. An annular groove is cut around the turned-down end 53 and a pin 56 is passed through the wedge from side to side to engage the upper portion of the groove 55. This pin and groove engagement permits rotation of the screw end in the wedge bore 54, but prevents any substantial relative longitudinal movement between the wedge and screw.

Because rotation of the screw 51, as well as manipulation of the tool 11, usually must be effected from a remote position, an operating, or extension member 61 is provided. It comprises a tubular portion 62 that telescopes over the right end (as viewed in Fig. 1) of the screw 51 to which the tubular portion is positively connected by a pin 63 and a screw 64, while a cross pin handle 65 is pinned to the other end of the tubular portion. The handle provides the end means for bodily moving and placing the tool in a desired position within the tube 12 as well as for advancing or retracting the plug driving means. However, in other forms of the invention, the means for bodily moving the tool and the means for transmitting power to the tool may, of course, be separate.

Proper location of the tool in a tube for the purpose of effecting a repair at any substantial distance within the tube usually requires light at that point. In the present embodiment of the invention, this illuminating feature is provided by a small electric lamp 71, mounted upon the block 52, with sufficient wire 72 to extend to any suitable source of electrical power to supply the lamp.

Figure 4:
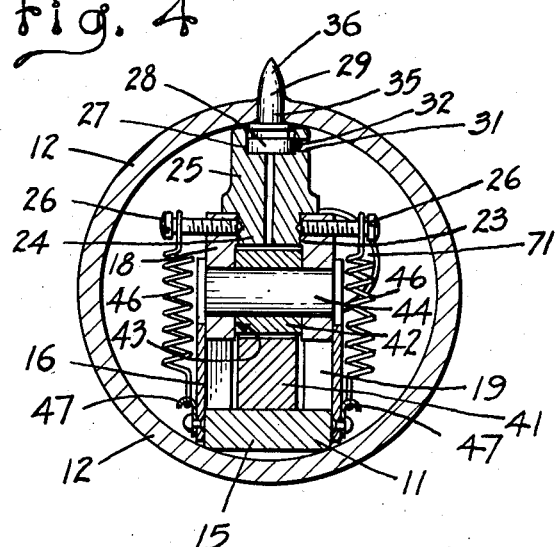
Fig. 4 is a transverse section through tube and tool, taken on the line 4—4 in Fig. 1, but showing the tool in expanded position and the plug inserted in the leak hole as indicated by dotted lines in Fig. 1.

The operation of the tool is as follows: The head 28 of a repair plug is pressed into the recess 27; the wire 72 is connected to a source of electrical power, and the tool is inserted into a defective tube 12, its base 15 resting on the inner surface of the wall of the tube. By means of the lamp 71, conveniently interposed between the plug and the eye of the operator so that the light rays are directed away from the operator, a leak hole is observed by a trickle or jet of water flowing inwardly of the tube. (This is usually found at the top of a leaking tube in a fire-tube boiler.) The point of the plug is directed, by means of the operating member 61, toward the leak hole indicated by the jet of water and, with the base 15 seated, as shown in Figs. 3 and 4, on the inner surface of the tube wall, opposite the leak, the handle 65 is turned to raise the tool head 16, and its releasably held plug, through the drive 17. This operation is continued until the nose 36 of the repair plug has passed through the tube wall and the shank 35 is driven into tight frictional and sealing engagement with the walls of the hole. In passing through the leak hole, the nose of the plug loosens the corroded portions of the walls of the hole and forces the more solid metal laterally of the plug to enlarge the hole, and to form more compact walls against which the cylindrical or tapered shank of the plug forms a superior sealing engagement.

When the plug is so driven home, the operator will sense that a slight amount of additional effort is required to turn the handle because the shoulder of the head of the plug, at such time, is in contact with the inner surface of the tube. The operator then reverses rotation of the handle and the elevator 16 is retracted by the tension of springs 46. During this retraction, the plug is securely held in the leak hole, therefore the spring or gripper 32 slides over the head of the plug, and the tool, thus freed from the plug, is withdrawn from the tube 12 and operation of the boiler may be resumed.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A repair plug driving tool comprising a base, a reciprocable plug-driving head, yieldable plug gripping means associated with said head, a guide frame, mounted on said base, adapted to retain said head and restrict the movement thereof to reciprocation substantially normal to the longitudinal axis of said tool, head driving means mounted on said base and operable from a position remote from said head to reciprocate said head with relatively greater force on its outward or plug-driving smoke than on its plub-retracting stroke, said tool being adapted for the repair of leak holes in tubes into which said tool is insertable with a repair plug yieldingly held on said head by said gripping means, said head driving means serving both as means to move said tool bodily in said tube to align said plug with a leak hole in the wall of said tube and as a power-transmitting means whereby an operator, from a remote position, may apply power wherewith to drive said plug into sealing position in said leak hole and subsequently to withdraw said driving means from engagement with said plug and out of said tube.

2. A repair plug driving tool comprising a base, plug driving means mounted on said base, releasable plug-retaining means associated with said driving means whereby a plug may be releasably retained on said driving means, and operating means adapted to transmit power to said driving means from a remote source, said tool being adapted for use in the repair of leak holes in confined spaces, and being insertable into a said confined space with a repair plug yieldingly held on said driving means by said gripping means, said operating means serving both as means to move said tool bodily in said space to align said plug with a leak hole in the wall of said space and as a power-transmitting means whereby an operator, from a remote position, may apply power to said driving means wherewith to drive said plug into sealing position in said leak hole and subsequently to withdraw said driving means from engagement with said plug and out of said tube.

3. A repair device comprising a repair plug, plug driving means, and plug retaining means associated with said plug driving means whereby a plug may be releasably retained on said driving means, said device being adapted for use in the repair of leak holes in confined spaces into which said device is insertable, said plug being forced into a leak hole by said driving means and remaining in sealing position in said leak hole when said driving means is retracted, said gripping means releasing its hold on said plug during the retraction of said driving means.

4. A tube repair device, insertable into a tube, comprising placing means for moving said device bodily within said tube, a head, mounted in said device for reciprocation substantially normal to the longitudinal axis of said tube, plug retaining means associated with said head, a repair plug releasably held on said head by said gripping means, and driving means for moving said head, with relatively great force, substantially normal to the longitudinal axis of said tube, said device being adapted for use in the repair of leak holes from the interior of tubes into which said device is insertable, said plug being forced into a leak hole by said driving means and remaining in sealing position in said leak hole when said head is retracted, said gripping means releasing its hold on said plug during the retraction of said head.

5. A tube repair device comprising a plug, a plug gripper adapted to yieldingly hold said plug, a slide supporting and securely holding said gripper, ways for guiding and restraining movement of said slide, a base upon which said ways are mounted, a wedge drive mounted upon said base and adapted to advance said slide, in said ways, in a direction substantially normal to the longitudinal axis of said tool, and yieldable retracting means tending to retract said slide against the action of said wedge drive, said repair device being adapted for use in the sealing of leak holes in tubes, said gripper serving to releasably hold said plug until said plug is driven by said wedge drive into sealing position in a said leak hole, and to release said hold upon said plug as said slide and gripper are retracted by said retracting means when the movement of said wedge drive is reversed.

6. In a repair tool, a plug driving head, a plug-receiving recess in said head, a slot in said head extending laterally from said recess to the outer surface of said head, and gripping means extending through said slot adapted to yieldingly engage an end of a repair plug placed within said recess.

AUGUST BAERENKLAU.
BERNHARD DEJA.